US008818373B2

(12) United States Patent
Okuda

(10) Patent No.: US 8,818,373 B2
(45) Date of Patent: Aug. 26, 2014

(54) RADIO COMMUNICATION METHOD IN RADIO COMMUNICATION SYSTEM, RADIO COMMUNICATION SYSTEM, BASE STATION APPARATUS AND TERMINAL APPARATUS

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/118,773

(22) Filed: May 31, 2011

(65) Prior Publication Data
US 2011/0230194 A1 Sep. 22, 2011

Related U.S. Application Data

(63) Continuation of application No. PCT/JP2009/000030, filed on Jan. 7, 2009.

(51) Int. Cl.
*H04W 36/00* (2009.01)
*H04W 48/08* (2009.01)
(52) U.S. Cl.
CPC ..................................... *H04W 48/08* (2013.01)
USPC ........................................... 455/436; 455/437
(58) Field of Classification Search
USPC ............................... 455/561, 434–437, 452.2
See application file for complete search history.

(56) References Cited

U.S. PATENT DOCUMENTS

| 2004/0219926 | A1* | 11/2004 | Kim et al. .................. 455/452.2 |
| 2005/0250499 | A1* | 11/2005 | Lee et al. ...................... 455/437 |
| 2006/0030322 | A1* | 2/2006 | Kim et al. ..................... 455/436 |
| 2006/0040699 | A1* | 2/2006 | Kim et al. ..................... 455/524 |
| 2006/0089144 | A1 | 4/2006 | Kim et al. |
| 2006/0194579 | A1 | 8/2006 | Leung et al. |
| 2007/0105592 | A1* | 5/2007 | Kang et al. ..................... 455/561 |
| 2008/0181120 | A1* | 7/2008 | Lee et al. ...................... 370/241 |
| 2008/0291875 | A1* | 11/2008 | Kang et al. ..................... 370/331 |
| 2009/0197599 | A1* | 8/2009 | Cho et al. ...................... 455/434 |
| 2009/0209254 | A1* | 8/2009 | Oguchi ......................... 455/434 |
| 2009/0227255 | A1* | 9/2009 | Thakare ........................ 455/434 |
| 2010/0113055 | A1 | 5/2010 | Iwamura et al. |

FOREIGN PATENT DOCUMENTS

| JP | 07-298335 | 11/1995 |
| JP | 2002-152252 | 5/2002 |
| JP | 2006-238451 | 9/2006 |
| JP | 2008-515271 | 5/2008 |
| WO | 2008/050424 | 5/2008 |
| WO | 2008/123074 | 10/2008 |

OTHER PUBLICATIONS

IEEE std 802.16TM-2004; "Part 16: Air Interface for Fixed Broadband Wireless Access Systems"; dated Oct. 1, 2004.

(Continued)

*Primary Examiner* — Nathan Taylor
(74) *Attorney, Agent, or Firm* — Myers Wolin, LLC

(57) ABSTRACT

A radio communication method in a radio communication system including a base station apparatus and a terminal apparatus, the method including: generating a public information message including identification information of a surround base station apparatus of the base station apparatus, and instruction information for receiving communication parameter information used to communicate with the terminal and the surround base station apparatus from the surround base station apparatus, by the base station apparatus; transmitting the generated public information message, by the base station apparatus; receiving the public information message, by the terminal apparatus; and receiving the communication parameter information transmitted by the surround base station apparatus based on the instruction information included in the public information message, by the terminal apparatus.

12 Claims, 16 Drawing Sheets

(56) References Cited

OTHER PUBLICATIONS

IEEE std 802.16eTM-2005; "Part 16: Air Interface for Fixed and Mobile Broadband Wireless Access Systems Amendment 2: Physical and Medium Access Control Layers for Combined Fixed and Mobile Operation in Licensed Bands"; Corrigendum 1, dated Feb. 28, 2006.

International Search Report issued for corresponding International Patent Application No. PCT/JP2009/000030, mailed Feb. 10, 2009.
Notification of Reason for Rejection issued for corresponding Japanese Patent Application No. 2010-545623 dispatched on Apr. 10, 2012 with English translation.

* cited by examiner

| Preamble Index | BSID | FA | DCD/UCD | |
|---|---|---|---|---|
| | | | Frame Offset | Interval |
| Preamble#1 | BS#1 | f1 | offset#1 | interval#1 |
| Preamble#2 | BS#2 | f2 | offset#2 | interval#2 |
| Preamble#3 | BS#3 | f3 | offset#3 | interval#3 |

| Preamble Index | BSID | FA | RSSI (CINR) | DCD settings | UCD settings |
|---|---|---|---|---|---|
| Preamble#1 | BS#1 | f1 | (#1)db | DCD settings#1 | UCD settings#1 |
| Preamble#2 | BS#2 | f2 | (#2)db | DCD settings#2 | UCD settings#2 |
| Preamble#3 | BS#3 | f3 | (#3)db | DCD settings#3 | UCD settings#1 |

FIG.18A

| PARAMETERS |
| --- |
| BSID |
| Preamble Index |
| FA (Frequency Assignment) |
| DCD settings |
| UCD settings |

FIG.18B

| PARAMETERS | |
| --- | --- |
| DCD settings | BS EIRP |
| | HO type support |
| | FEC/Modulation type |
| UCD settings | Ranging |
| | UL subchannel bitmap |
| | FEC/Modulation type |

RADIO COMMUNICATION METHOD IN RADIO COMMUNICATION SYSTEM, RADIO COMMUNICATION SYSTEM, BASE STATION APPARATUS AND TERMINAL APPARATUS

CROSS-REFERENCE TO RELATED APPLICATION

This application is a continuation of International Application No. PCT/JP2009/000030, filed on Jan. 7, 2009, now pending, herein incorporated by reference.

FIELD

The embodiments discussed herein are related to a radio communication method in a radio communication system, a radio communication system, a base station apparatus and a terminal apparatus.

BACKGROUND

Conventional base stations transmit neighbor advertisement (NBR-ADV) messages by cyclically broadcasting to terminals under their control (see, for example, Non-Patent Documents 1 and 2). The terminals execute handover using parameters contained in the NBR-ADV message.

FIG. 18A illustrates an example of parameters contained in an NBR-ADV message. The NBR-ADV message contains "BSID" and the like of surround base stations, as well as "DCD settings" and "UCD settings".

FIG. 18B illustrates an example of parameters contained in "DCD settings" and "UCD settings". "DCD settings" and "UCD settings" include various parameters relating to connections between terminals and base stations in the downlink direction and uplink direction, respectively.

On the other hand, base stations cyclically transmit Downlink Channel Descriptor (DCD) and Uplink Channel Descriptor (UCD) messages to terminals under their control. The DCD and UCD messages transmitted by base stations contain "DCD settings" and "UCD settings" for connecting with that base station.

Accordingly, in addition to a connection destination base station to which a terminal is currently radioly connected transmitting "DCD settings" and "UCD settings" relating to surround base stations present in an area surrounding that base station contained in an NBR-ADV message, each of the surround base stations also transmits "DCD settings" and "UCD settings" relating to their own station contained in DCD and UCD messages.

Non-Patent Document 1: IEEE Std 802.16TM-2004
Non-Patent Document 2: IEEE Std 802.16TMe-2005

However, although the amount of information contained in "DCD settings", "UCD settings" and the like is considerable, efforts to increase the amount of information of NBR-ADV messages to actively utilize the radio band have not been adequately implemented.

SUMMARY

According to an aspect of the invention, a radio communication method in a radio communication system including a base station apparatus and a terminal apparatus, the method including: generating a public information message including identification information of a surround base station apparatus of the base station apparatus, and instruction information for receiving communication parameter information used to communicate with the terminal and the surround base station apparatus from the surround base station apparatus, by the base station apparatus; transmitting the generated public information message, by the base station apparatus; receiving the public information message, by the terminal apparatus; and receiving the communication parameter information transmitted by the surround base station apparatus based on the instruction information included in the public information message, by the terminal apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 18A and 18B respectively illustrate an example of parameters contained in an NBR-ADV message, and an example of parameters contained in an NBR-ADV message and DCD and UCD messages.

DESCRIPTION OF EMBODIMENTS

The following provides an explanation of embodiments of the present invention.

First Embodiment

Figure 1:
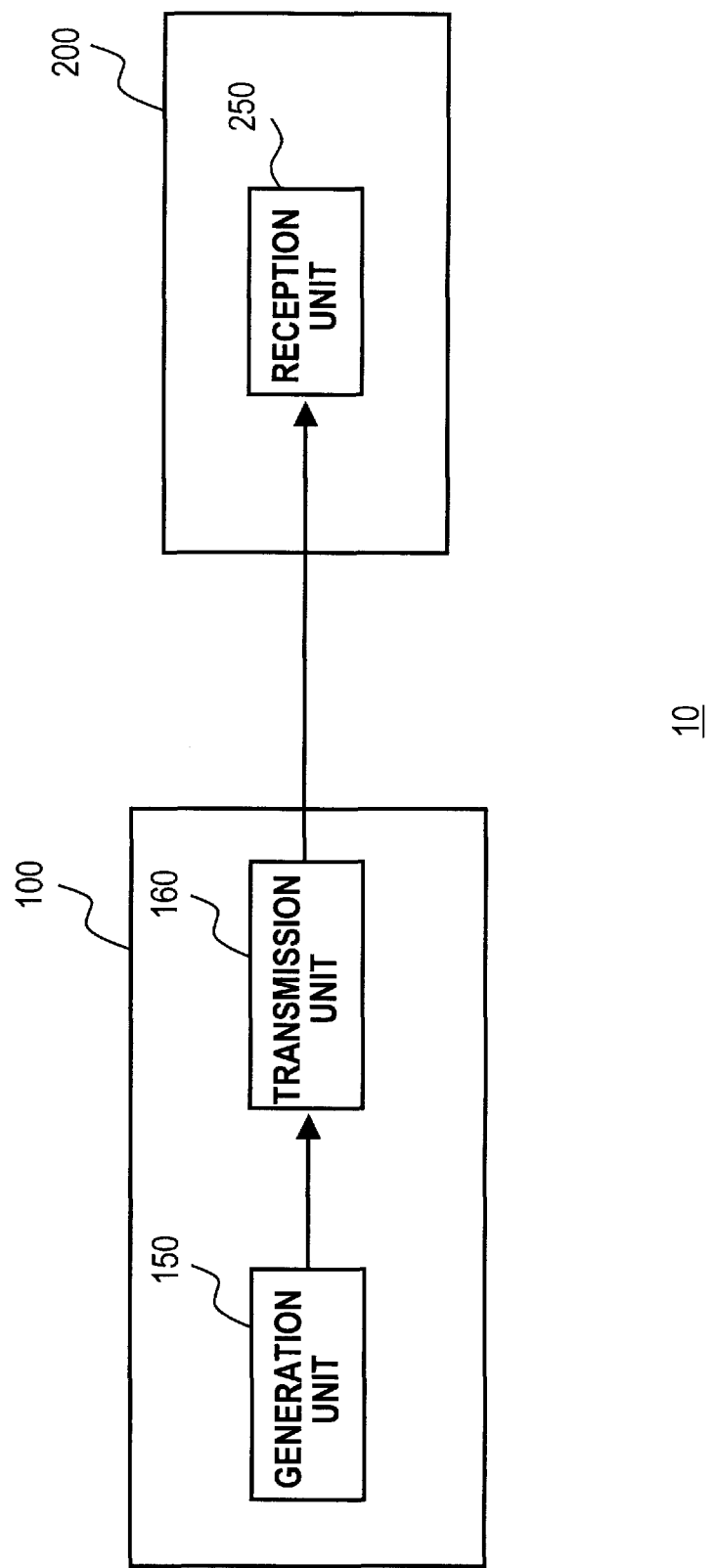
FIG. 1 illustrates an example of the configuration of a radio communication system.

The following provides an explanation of a first embodiment. FIG. 1 illustrates an example of the configuration of a radio communication system 10. In the radio communication system 10 including a base station apparatus 100 and a terminal apparatus 200, the base station apparatus 100 includes a generation unit 150, which generates public information messages containing identification information of a surround base station apparatus of the base station apparatus 100, and instruction information for receiving communication parameter information from the surround base station apparatus used for communication with the terminal and surround base station apparatus, and a transmission unit 160, which transmits the generated public information messages. The terminal apparatus 200 includes a reception unit 250 which receives the public information messages, and receives the communication parameter information transmitted by the surround base station apparatus based on the instruction information contained in the public information messages.

Since the communication parameter information includes various parameters used in radio communication (including transmitting power of the base station, code information used when specifying the modulation method and encoding rate used, DCD and UCD message information, gaps between transmitting periods and receiving periods, various information used for HARQ control, threshold information used as handover starting conditions, and code information to be used in various types of ranging), although there are many cases in which the amount of information exceeds several hundred bytes per a single piece of information relating to the base station, since the instruction information can be made to be information useful for receiving various parameters (constituting a comparatively small amount of information (less than that of communication parameter information) such as reception timing), the amount of information is small.

Thus, it was decided to effectively utilize various parameters transmitted by the surround base stations per se for all or a portion of the various parameters. Namely, by not including all or a portion of the various parameters transmitted by the surround base stations in public information messages, but rather transmitting information useful for receiving various parameters transmitted by the surround base stations (constituting a comparatively small amount of information (less than that of communication parameter information) such as reception timing), the amount of information of public information messages can be reduced overall.

Furthermore, base station identification information such as base station ID and preamble identification information (Preamble Index) transmitted by the base station consists of a small amount of information, and may be contained in public information messages by treating separately from communication parameters.

As has been explained above, in a certain aspect, in the radio communication method in a radio communication system including a base station apparatus and a terminal apparatus in the first embodiment, the base station apparatus transmits neighbor base station information including identification information of a surround base stations and transmission timing information of parameter information transmitted by the surround base stations, while the terminal apparatus receives parameter information transmitted by the surround base stations by utilizing received transmission timing information. Here, the amount of the transmission timing information is preferably less than the total amount of parameter information transmitted by the surround base stations capable of being received based on the transmission timing information. However, since the transmission timing information is not required to be updated in response to changes in the contents of parameter information transmitted by the surround base stations and the like in the case such changes occur, increases in processing complexity can be suppressed, thereby enabling this method to continue to be effective even in cases in which the amount of information is low.

Second Embodiment

Figure 2:
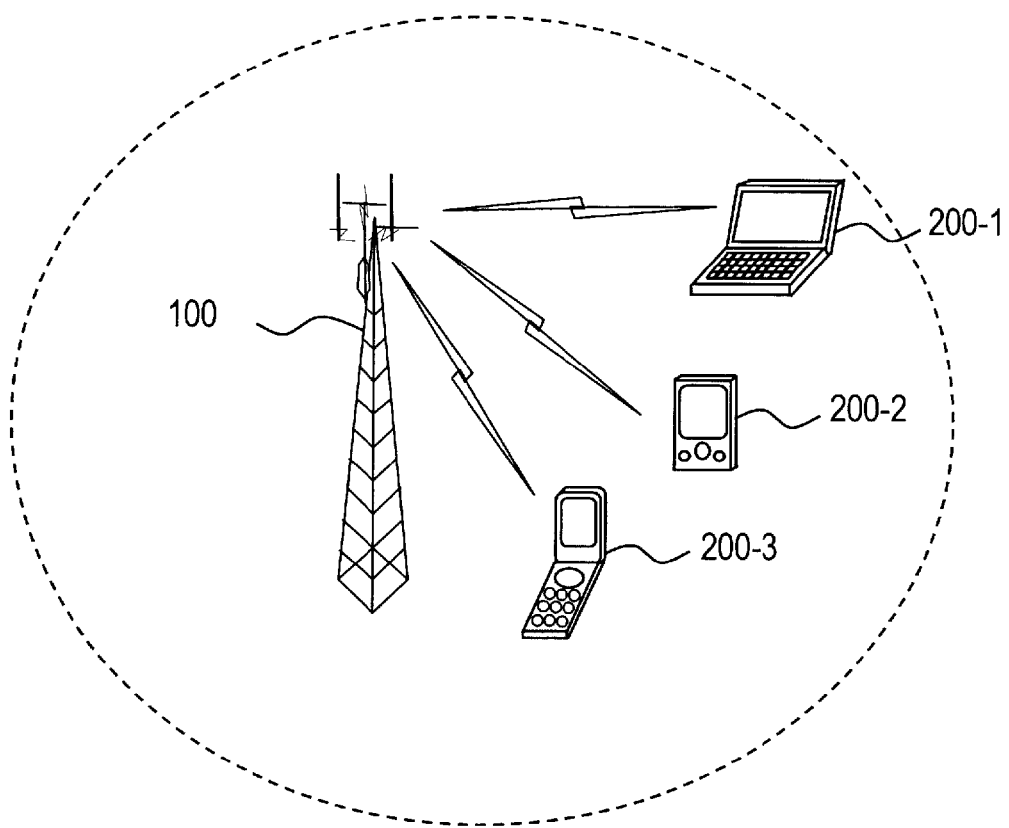
FIG. 2 illustrates another example of the configuration of a radio communication system.

FIG. 2 illustrates an example of the configuration of the radio communication system 10. The radio communication system 10 is provided with the base station apparatus (or base station (BS)) 100 and the terminal apparatus (or mobile station (MS)) 200.

The radio communication system 10 is based on a P-MP connection system in which a plurality of MS 200 is connected to a single BS 100. As illustrated in this drawing, as the MS 200 a personal computer 200-1, a personal digital assistant (PDA) 200-2, or a cell phone 200-3 and the like are connected to BS 100.

Figure 3:
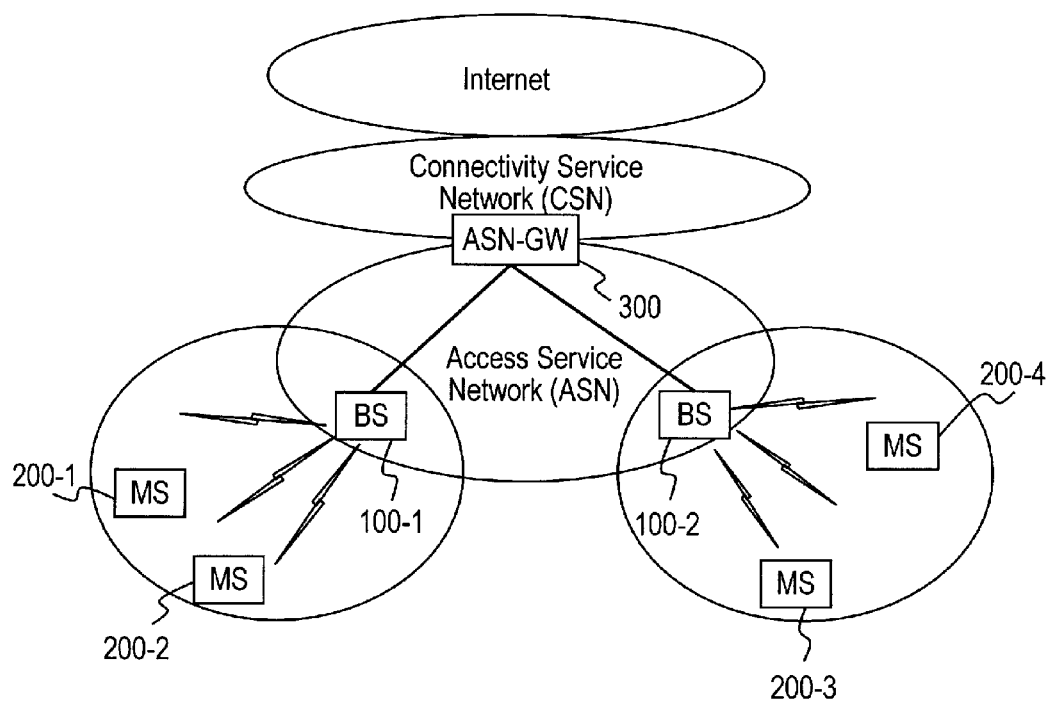
FIG. 3 illustrates an example of the configuration of a network.

FIG. 3 illustrates an example of the configuration of a network that includes the radio communication system 10. The BS 100-1 and 100-2 are connected to an access service network gateway (ASN-GW) 300. The ASN-GW 300 carries out various types of control for the connected BS 100-1 and 100-2.

Furthermore, the network composed by the BS 100-1 and 100-2 and the ASN-GW 300 is referred to as an access service network (ASN), and packets are transferred in a layer 2, for example. In addition, the ASN-GW 300 is connected to a connectivity service network (CSN), and packet routing and transfer are carried in a layer 3, for example.

Figure 4:
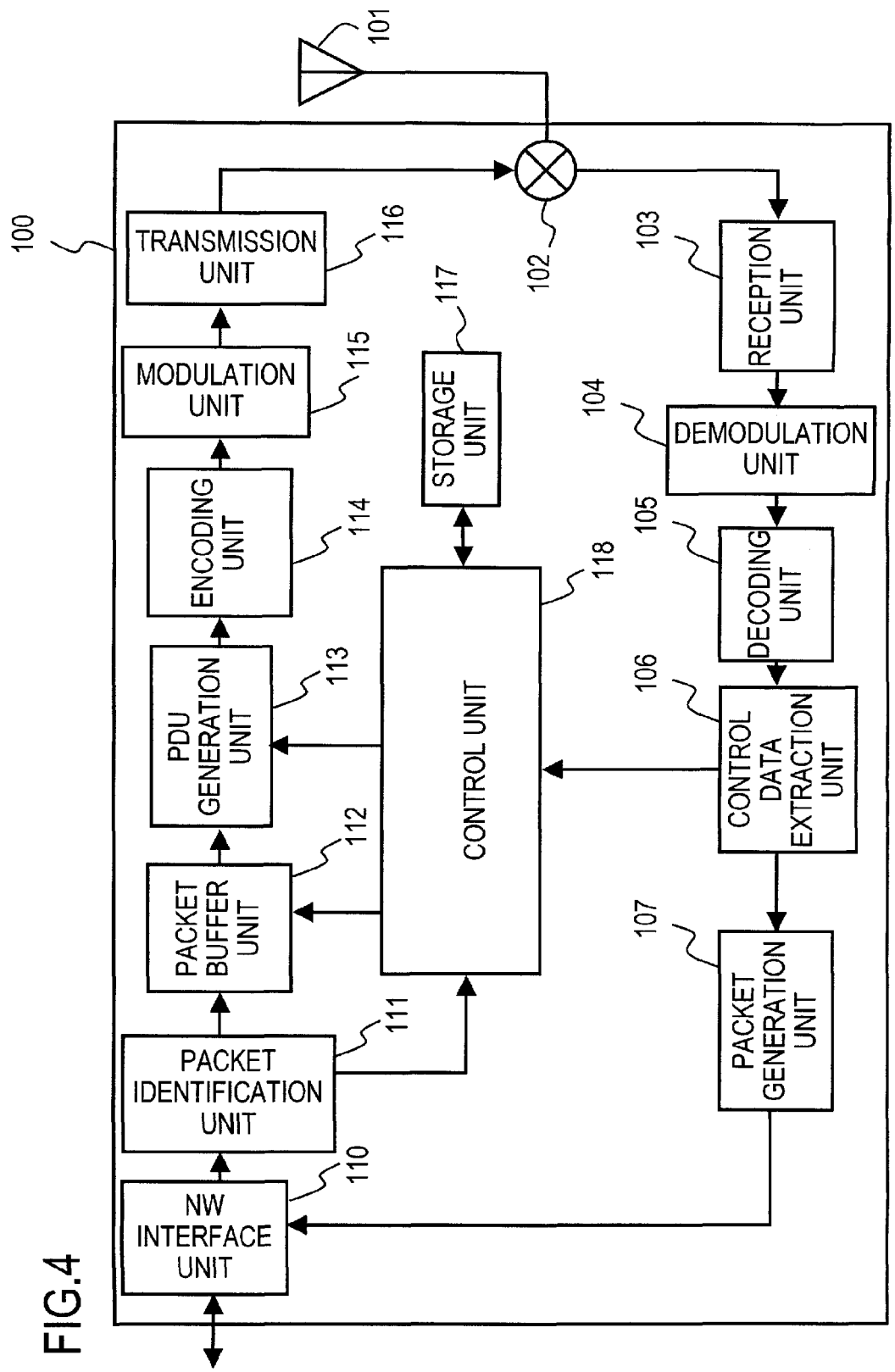
FIG. 4 illustrates an example of the configuration of a base station apparatus.
Figure 5:
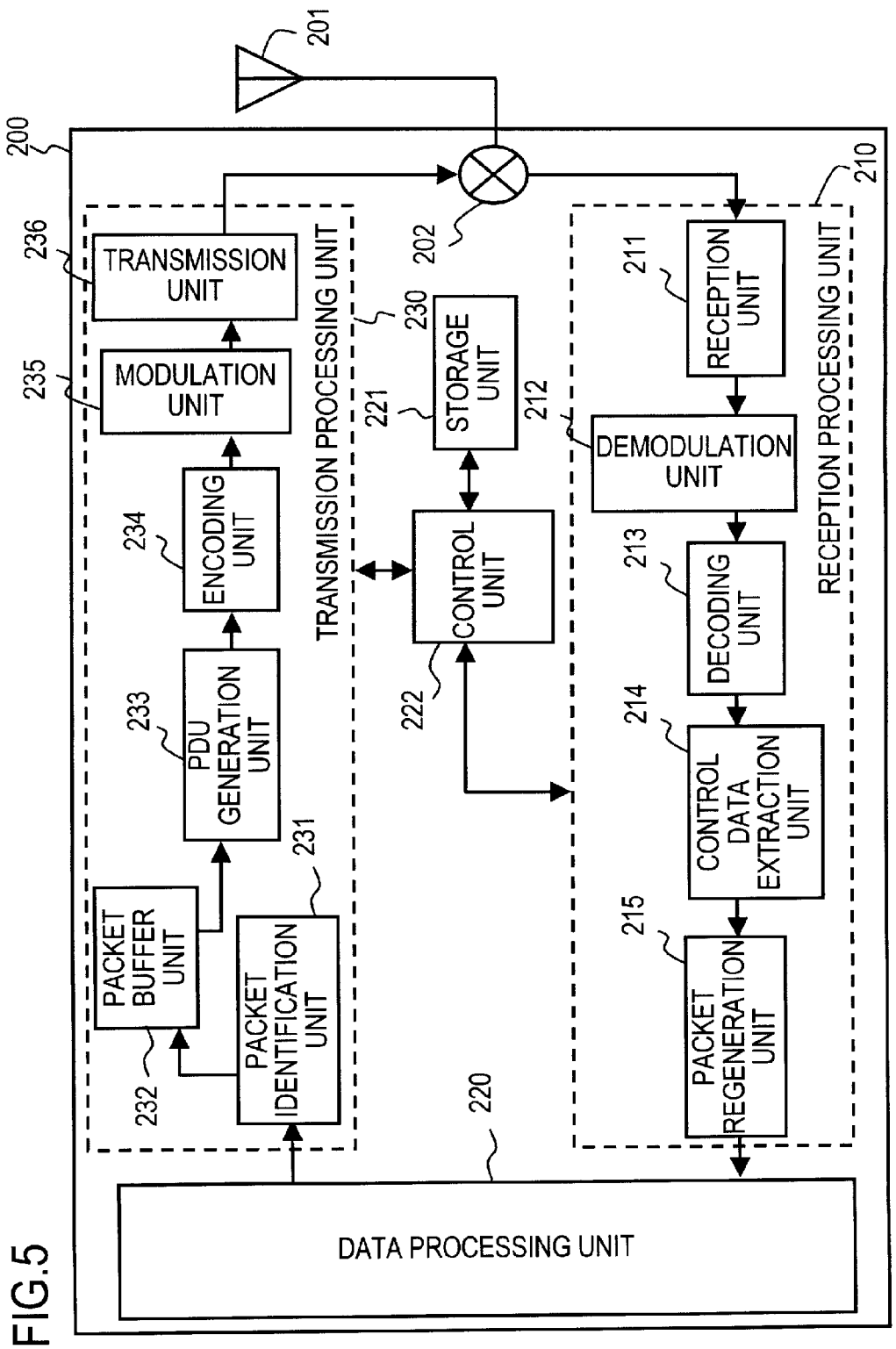
FIG. 5 illustrates an example of the configuration of a terminal apparatus.

Next, an explanation is provided of an example of the configuration of the BS 100 and the MS 200. FIG. 4 illustrates an example of the configuration of the BS 100, while FIG. 5 illustrates an example of the configuration of the MS 200.

The BS 100 is provided with an antenna 101, a duplexer 102, a reception unit 103, a demodulation unit 104, a decoding unit 105, a control data extraction unit 106, a packet regeneration unit 107, a network (NW) interface unit 110, a packet identification unit 111, a packet buffer unit 112, a protocol data unit (PDU) generation unit 113, an encoding unit 114, a modulation unit 115, a transmission unit 116, a storage unit 117 and a control unit 118.

In this second embodiment, an explanation is provided of the case using the storage unit 117, the control unit 118 and the PDU generation unit 113 as an example of the generation unit 150 in the first embodiment, and the case of using the encoding unit 114, the modulation unit 115, the transmission unit 116, the duplexer 102 and the antenna 101 as an example of the transmission unit 160.

The antenna 101 transmits and receives radio signals to and from the MS 200.

The duplexer 102 is a combiner for sharing signals transmitted and received with the antenna 101 with the transmission and reception system of the BS 100.

The reception unit 103 inputs reception signals received with the antenna 101 via the duplexer 102.

The demodulation unit 104 demodulates reception signals from the reception unit 103.

The decoding unit 105 decodes reception signals demodulated with the demodulation unit 104.

The control data extraction unit 106 extracts control data from reception signals decoded with the decoding unit 105, and respectively outputs control data to the control unit 118 and other data such as user data to the packet regeneration unit 107.

The packet regeneration unit 107 packetizes data output from the control data extraction unit 106.

The NW interface unit 110 is connected to a host apparatus such as the ASN-GW 300, transmits packets from the packet regeneration unit 107 to the host apparatus, and receives packet data from the host apparatus.

The packet identification unit 111 identifies an Internet Protocol (IP) address for packet data from the packet regeneration unit 107, and specifies the MS 200 serving as the address of the packet data. In addition, the packet identification unit 111 requests a band by outputting to the control unit 118 the ID of the specified MS 200, quality of service (QoS) information for packet data from the packet regeneration unit 107.

The packet buffer unit 112 stores packet data from the packet identification unit 111 under the control of the control unit 118.

The PDU generation unit 113 generates PDU containing user data or control data transmitted to the MS 200 under the control of the control unit 118.

The encoding unit 114 encodes PDU from the PDU generation unit 113, and the modulation unit 115 modulates the encoded PDU.

The transmission unit 116 transmits the modulated PDU as transmission signals to the antenna 101 via the duplexer 102. Transmission signals are then radioly transmitted to the MS 200 from the antenna 101.

The storage unit 117 stores information relating to surround BS contained in DCD and UCD messages or control messages such as NBR-ADV messages, and communication parameter information and the like required for radio communication. Details will be subsequently described. Furthermore, the storage unit 117 also stores MS function information, authentication information and the like received from the MS 200.

The control unit 118 instructs transmission of control messages to the PDU generation unit 113, and outputs information required to generate control messages stored in the storage unit 117, such as information relating to surround BS or communication parameter information required for radio communication, to the PDU generation unit 113. In addition, the control unit 118 carries out scheduling based on information such as ID from the packet identification unit 111, and controls the packet buffer unit 112 and the PDU generation unit 113 so that transmission signals are transmitted in accordance with that scheduling.

FIG. 5 illustrates an example of the configuration of the MS 200. The MS 200 is provided with an antenna 201, a duplexer 202, a reception processing unit 210, a data processing unit 220, a storage unit 221, a control unit 222 and a transmission processing unit 230.

In the present second embodiment, an explanation is provided of the case of using a reception unit 211, a demodulation unit 212, a decoding unit 213, a control data extraction unit 214, the control unit 222 and the storage unit 221 as an example of the reception unit 250 in the first embodiment.

The antenna 201 transmits and receives radio signals to and from the BS 100.

The duplexer 202 is a combiner for sharing signals transmitted and received with the antenna 201 with the reception processing unit 210 and the transmission processing unit 230 of the MS 200.

The reception processing unit 210 is provided with the reception unit 211, the demodulation unit 212, the decoding unit 213, the control data extraction unit 214 and a packet regeneration unit 215.

The reception unit 211 inputs reception signals received with the antenna 201 via the duplexer 202.

The demodulation unit 212 demodulates reception signals from the reception unit 211.

The decoding unit 213 decodes reception signals demodulated with the demodulation unit 212.

The control data extraction unit 214 extracts control data from reception signals decoded with the decoding unit 213, and outputs control data to the control unit 222 and other data such as user data to the packet regeneration unit 215.

The packet regeneration unit 215 packetizes data output from the control data extraction unit 214.

The data processing unit 220 carries out various processing such as display processing or audio output on packet data from the control data extraction unit 214. In addition, the data processing unit 220 outputs packet data containing user data transmitted to a apparatus at a communication destination to the transmission processing unit 230.

The transmission processing unit 230 is provided with a packet identification unit 231, a packet buffer unit 232, a PDU generation unit 233, an encoding unit 234, a modulation unit 235 and a transmission unit 236.

The packet identification unit 231 identifies an IP address included in packet data from the data processing unit 220, specifies a connection according to the ID, and requests transmission by outputting QoS information and the like for the connection ID to the control unit 222.

The packet buffer unit 232 stores packet data from the packet identification unit 231 under the control of the control unit 222.

The PDU generation unit 233 generates PDU containing control data or user data included in packet data under the control of the control unit 222.

The encoding unit 234 encodes PDU from the PDU generation unit 233. The modulation unit 235 modulates the encoded PDU, and the transmission unit 236 outputs the modulated PDU to the antenna 201 via the duplexer 202. Transmission signals are then radioly transmitted to the BS 100 from the antenna 201.

The storage unit 221 stores information contained in NBR-ADV messages received from the BS 100 or control messages such as DCD and UCD messages, such as information relating to surround BS, and parameter information and the like required for communication. In addition, the storage unit 221 stores information such as authentication information or key information.

The control unit 222 stores information contained in control messages received from the BS 100 in the storage unit 221. In addition, the control unit 222 instructs the generation of control messages transmitted when executing handover, for example, to the PDU generation unit 233. At that time, the control unit 222 outputs information stored in the storage unit 221 required for transmission of control messages to the PDU generation unit 233. Moreover, the control unit 222 requests a band to the BS 100, and controls the packet buffer unit 232 and the PDU generation unit 233 so that control data contained in control messages, user data and the like are transmitted in the assigned band.

Now, one example of hardware configuration of a base station is explained. The base station includes a radio communication IF (interface), processor, memory, logic circuit, wired communication IF (interface) and so on. The radio communication IF is a interface device to perform radio communication with the terminal apparatus. The processor is a device to process data, and includes, for example, CPU (central Processing Unit), DSP (Digital Signal Processor), or another devices. The memory is a device to storage data, and includes, for example, ROM (Read Only Memory), RAM (Random Access Memory), or another devices. The logic circuit is an electronic circuit to perform logic operation, and includes, for example, LSI (Large Scale Integration), FPGA (Field-Programming Gate Array), or another devices. The wired communication IF is an interface device to perform wired communication with another base stations and so on connected to a network (so called, backhaul network) in a mobile phone system.

In addition, the correspondence of the base station 100 illustrated in FIG. 4 to the hardware of the base station is as follows, for example. The radio communication IF corresponds to the antenna 101, duplexer 102, transmission unit 116, and reception unit 103, for example. The processor and logic circuit correspond to the demodulation unit 104, decoding unit 105, control data extraction unit 106, packet regeneration unit 107, packet identification unit 111, packet buffer 112, PDU generation unit 113, encoding unit 114, modulation unit 115, and control unit 118, for example. The memory corresponds to the storage unit 117, for example. The wired communication IF corresponds to the NW interface unit 110, for example.

And, one example of hardware configuration of a terminal apparatus is explained. The terminal apparatus includes a radio communication IF (interface), processor, memory, logic circuit, input IF, output IF, and so on. The radio communication IF is an interface device to perform radio communication with the base station. The processor is a device to process data, and includes, for example, CPU (Central Processing unit), DSP (Digital signal Processor), or another devices. The memory is a device to storage data, and includes, for example, ROM (Read Only Memory), RAM (Random Access Memory), or another devices. The logic circuit is an electronic circuit to perform logic operation, and includes, for example, LSI (Large Scale Integration), FPGA (Field-Programming Gate Array), or another devices. The input IF is a device to perform input, and includes, for example, push button, microphone, or another devices. The output IF is a device to perform output, and includes, for example, display, speaker, or another devices.

In addition, the correspondence of the terminal apparatus 200 illustrated in FIG. 5 to the hardware of the terminal apparatus is as follows, for example. The radio communication IF corresponds to the antenna 201, duplexer 202, transmission unit 236, and reception unit 211, for example. The processor and logic circuit correspond to the demodulation unit 212, decoding unit 213, control data extraction unit 214, packet regeneration unit 215, data processing unit 220, control unit 222, packet identification unit 231, packet buffer unit 232, PDU generation unit 233, encoding unit 234, and modulation unit 235, for example. The memory corresponds to the storage unit 221, for example.

Figure 6:
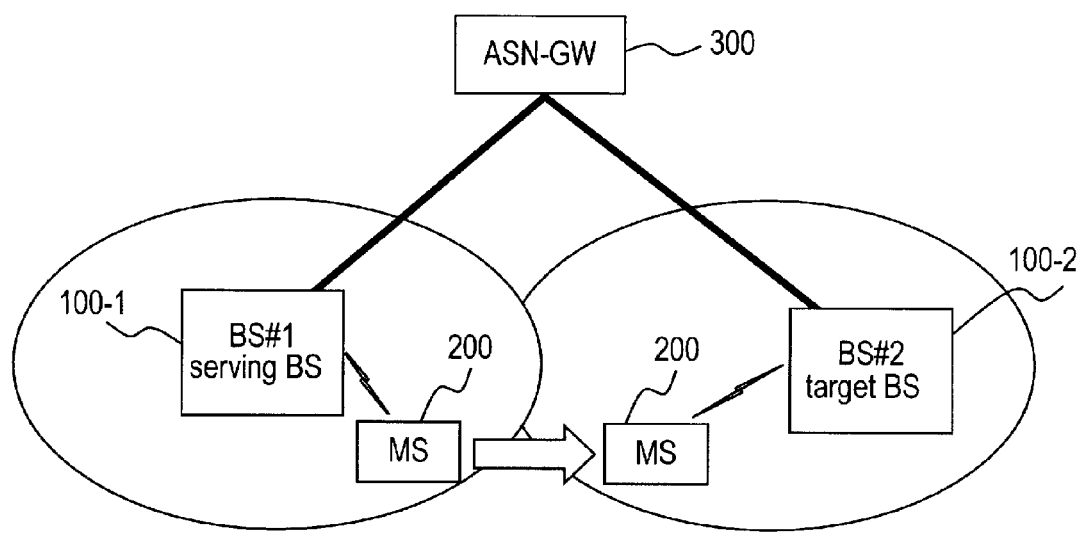
FIG. 6 illustrates an example of the operation of a terminal apparatus.

Next, an explanation is provided of operation. FIG. 6 illustrates an example of operation. As illustrated in FIG. 6, the MS 200 carries out handover from the service area of 100-1 of the BS of the connection origin (to be referred to as the serving BS (SBS)) to 100-2 of the BS of the connection destination (to be referred to as the target BS (TBS)). The following provides an explanation of this using the example indicated below.

Figure 7:
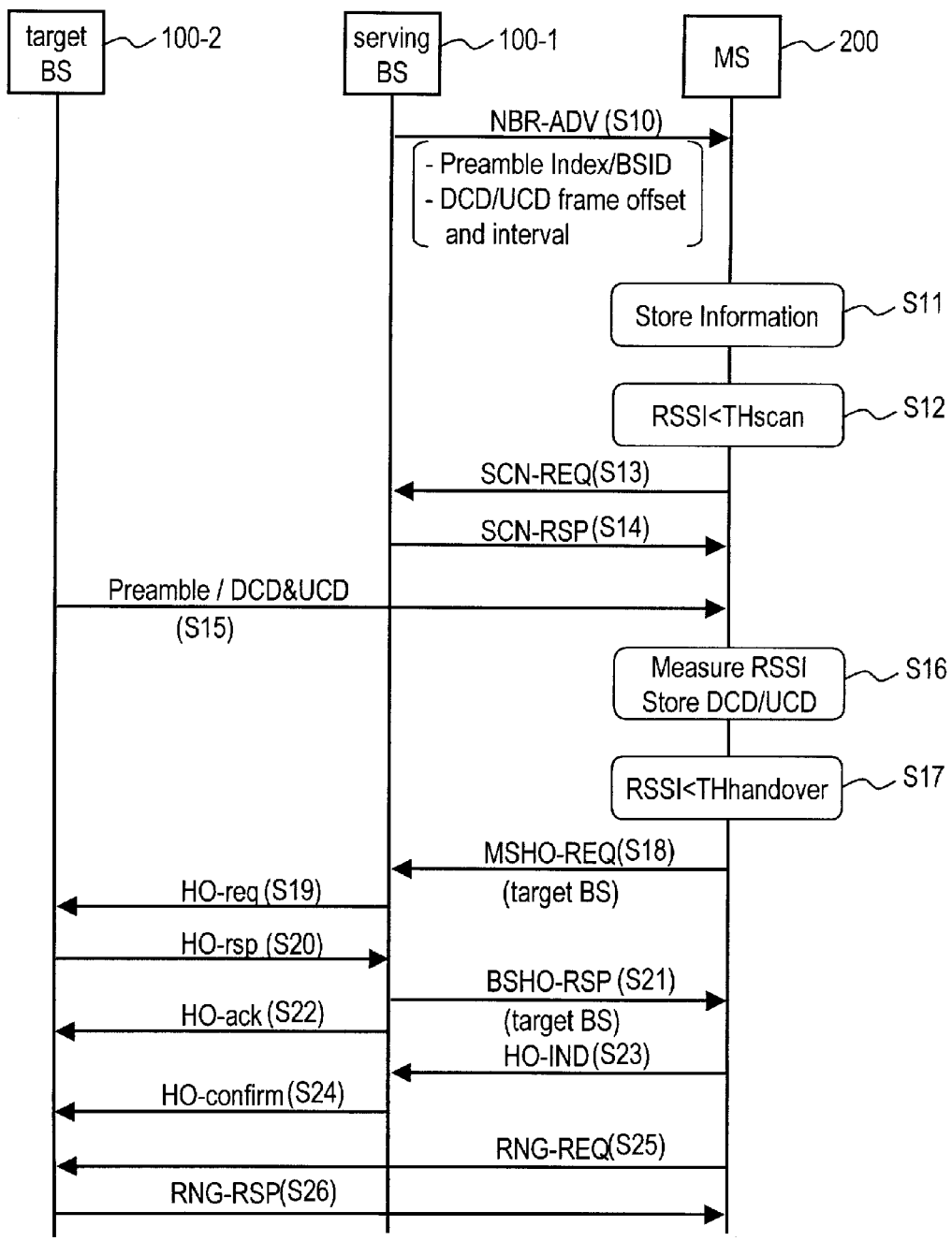
FIG. 7 is a sequence diagram illustrating an example of operation in a radio communication system.

FIG. 7 is a sequence diagram illustrating an example of operation. The SBS 100-1 transmits a public information message such as an NBR-ADV message in a cyclic broadcast (S10).

Figures 8, 9:
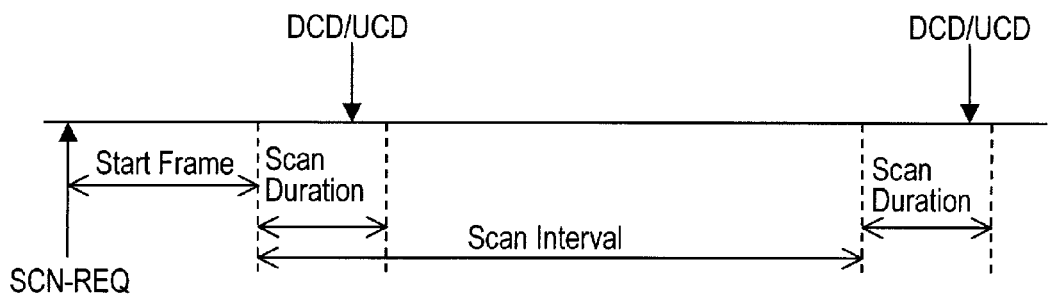
FIG. 8 illustrates an example of information stored in a storage unit.
FIG. 9 illustrates an example of the relationship between scanning period and transmission timing of DCD and UCD messages.

FIG. 8 illustrates an example of information contained in an NBR-ADV message. The NBR-ADV message also contains identification information of surround BS, such as "Preamble Index", "BS ID" or "frequency assignment (FA)", as well as instruction information required for receiving DCD and UCD messages transmitted from the surround BS 100. The instruction information includes transmission timing information for transmitting DCD and UCD messages. FIG. 8 illustrates an example using "frame offset" and "interval" as transmission timing information.

"Frame offset" indicates how many radio frames after transmitting an NBR-ADV message by the SBS 100-1 the surround BS 100 transmits the DCD and UCD messages. In addition, "interval" indicates the transmission cycle at which DCD and UCD messages are transmitted in the surround BS 100, for example. The transmission cycle is represented as a number of radio frames. In the example of FIG. 8, transmission timing information for transmitting DCD and UCD messages is indicated as a number of radio frames.

Transmission timing information may also be represented by a number of symbols or time and the like. For example, "frame offset" and "interval" may be represented with a number of symbols, time and the like. In addition, if the frequency subchannel at which DCD and UCD messages are transmitted is determined in advance, instruction information may also be information specified by the frequency subchannel.

This processing (S10) is carried out, for example, in the manner described below. Namely, information relating to surround BS, instruction information and the like are stored in the storage unit 117 of the SBS 100-1, and the control unit 118 reads out this information from the storage unit 117, outputs the information to the PDU generation unit 113, and instructs generation of an NBR-ADV message. The NBR-ADV message generated in the PDU generation unit 113 is then transmitted in a broadcast via the encoding unit 114 and the like.

Next, the MS 200 receives the NBR-ADV message and stores the information contained therein (S11). For example, the control unit 222 of the MS 200 extracts information from the NBR-ADV message received via the control data extraction unit 214 and the like, and stores the information in the storage unit 221. FIG. 8 also illustrates an example of information stored in the storage unit 221 of the MS 200.

Next, the MS 200 transmits an SCN-REQ message to the SBS 100-1 when the reception signal level from the SBS 100-1 (such as an RSSI (receiving signal strength indicator) or CINR (carrier to noise and interference ratio)) has fallen below a threshold value (THscan) (S12, S13).

In this second embodiment, the MS 200 transmits a scanning period included in the SCN-REQ message in order to negotiate a scanning period with the SBS 100-1. The scanning period is, for example, a period during which communication with the SBS 100-1 is interrupted. During the scanning period, the MS 200 receives DCD and UCD messages required when, for example, measuring the reception signal level of the surround BS 100 and carrying out handover. The MS 200 includes parameters specifying the scanning period in the SCN-REQ message transmitted to the SBS 100-1.

Parameters specifying the scanning period include, for example, a "start frame", which indicates the radio frame at which scanning is initiated after transmitting the SCN-REQ message, a "scan duration", which indicates the number of radio frames of the scanning period, and a "scan interval", which indicates the number of radio frames of a repeating interval of the scanning period. Each parameter may also be represented with time in addition to being represented with a number of radio frames.

However, when setting the "scan duration", the MS 200 sets the "scan duration" so that DCD and UCD messages from the surround BS 100 can be received within this period. Since transmission of DCD and UCD messages is included in the instruction information of NBV-ADV messages, the MS 200 utilizes this to set each parameter so that the transmission timing of the DCD and UCD messages is contained within the scanning period. A description of setting the scanning period will be subsequently described.

This processing (S12, S13) is carried out, for example, in the manner described below. Namely, the reception unit 211 measures the reception signal level of the surround BS 100 and outputs that reception signal level to the control unit 222, and the control unit 222 compares the reception signal level with a threshold value (THscan) stored in the storage unit 221 to determine whether or not the reception signal level has fallen below the threshold value. In addition, the control unit 222 generates parameters for specifying the scanning period based on instruction information stored in the storage unit 221 and outputs those parameters to the PDU generation unit 223 along with instructions for generation of the SCN-REQ message, and that message is then transmitted to the SBS 100-1 from the PDU generation unit 233 and the like.

Furthermore, in the case the MS 200 scans a plurality of the surround BS 100, parameters are specified for each of the surround BS 100, and in this case, the control unit 222 may transmit messages that include, for example, identifiers (such as a "BS ID" or "Preamble Index") of the surround BS 100.

The SBS 100-1 transmits an SCN-RSP message to the MS 200 when it has received the SCN-REQ message (S14). The SCN-RSP message contains parameters specifying the scanning period and a "BS ID" or "Preamble Index" and the like of the surround BS 100 to be scanned. The SBS 100-1 may transmit this parameter and other information as is, or may transmit those parameters determined by the SBS 100-1. In the case of determining parameters with the SBS 100-1 as well, the scanning period is made to be included in the transmission timing of the DCD and UCD messages as illustrated in FIG. 9. The SBS 100-1 does not transmit data or control information for the MS 200 during the scanning period.

This processing (S14) is carried out, for example, in the manner indicated below. Namely, the control unit 118 of the SBS 100-1 receives the SCN-REQ message via the control data extraction unit 106 and the like, and outputs the above-mentioned parameters to the PDU generation unit 113. The control unit 118 then instructs the PDU generation unit 113 to transmit the SCN-RSP message, and that message is transmitted from the PDU generation unit 113.

The MS 200 executes a scan based on information in the received SCN-RSP message. Namely, the MS 200 measures the reception signal level and receives the DCD and UCD messages from the surround BS 100 in synchronization with the surround BS 100 during the scanning period negotiated with the SBS 100-1 (S15, S16). The MS 200 then receives the DCD and UCD messages from the surround BS 100 during the scanning period specified by parameters contained in the SCN-RSP message in synchronization with any of the surround BS 100 using the "Preamble Index" received according to the NBR-ADV message, for example. The MS 200 then stores the reception signal level and information contained in the received DCD and UCD messages.

The DCD and UCD messages contain communication parameters for connecting to the BS 100 to which the messages were transmitted by the MS 200, such as "DCD settings" and "UCD settings". Thus, the MS 200 is able to receive communication parameter information required for communicating with the surround BS 100 by receiving the DCD and UCD messages.

Figures 10, 11:
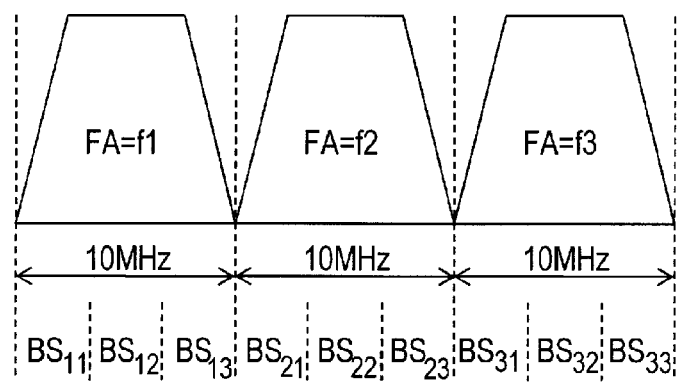
FIG. 10 illustrates an example of information stored in a storage unit.
FIG. 11 illustrates an example of the relationship between central frequencies in respective base station apparatuses.

FIG. 10 illustrates an example of information stored in the MS 200. Among this information, "Preamble Index", "BS ID" and "FA" constitute information contained in NBR-ADV messages, while "RSSI (CINR)" indicates the reception signal level of the surround BS 100 measured, and "DCD settings" and "UCD settings" are an example of communication parameter information contained in DCD messages and UCD messages, respectively.

This processing (S15, S16) is carried out, for example, in the manner described below. Namely, the control unit 222 receives an SCN-RSP message via the control data extraction unit 214 and the like, and synchronizes the transmission processing unit 230 with the surround BS 100 using, for example, the "Preamble Index" stored in the storage unit 221. The reception unit 211 measures the reception signal level of the surround BS 100 and outputs the measured reception signal level to the control unit 222. Moreover, the control unit 222 receives DCD and UCD messages from the surround BS 100 during the scanning period specified by parameters contained in the SCN-RSP message. Furthermore, the control unit 222 may also transmit the measured reception signal level to the SBS 100-1.

In addition, the DCD and UCD messages of the surround BS 100 are transmitted from the PDU generation unit 233 by, for example, storing communication parameter information and the like in the storage unit 221, and the control unit 222 outputting to the MS 200 this information to the PDU generation unit 233 and instructing those messages to be generated.

Next, if the signal reception level of the SBS 100-1 (such as RSSI or CINR) falls below a threshold value (THhandover), the MS 200 transmits an MSHO-REQ message to the SBS 100-1 in order to initiate handover (S18). For example, when the control unit 222 of the SBS 100-1 determines that the reception signal level measured with the reception unit 211 has fallen below the threshold value (THhandover), it instructs the PDU generation unit 233 to generate an MSHO-REQ message, and that message is transmitted to the SBS 100-1 from the PDU generation unit 233. At least one TBS 100-2 candidate to become the handover destination determined by the MS 200 can also be contained in the MSHO-REQ message.

After this point, a series of handover sequences are executed among the SBS 100-1, the TBS 100-2 and the MS 200.

After having received the MSHO-REQ message, the SBS 100-1 selects a TBS candidate for the handover destination based on that message, and transmits an HO-req message to the selected TBS (S19). FIG. 7 illustrates an example of the TBS 100-2 having been selected as the TBS candidate. For example, the control unit 118 of the SBS 100-1 selects the TBS candidate, instructs the PDU generation unit 113 to transmit the HO-req message to the selected TBS 100-2, and that message is then transmitted from the PDU generation unit 113. The HO-req message is transmitted via the ASN-GW 300.

Next, the TBS 100-2 receives the HO-req message and transmits an HO-rsp message to the SBS 100-1 (S20). The HO-rsp message contains information as to whether or not the MS 200 can be accepted, and contains information relating to ranging processing for initiating connection with the TBS 100-2 in the case it is accepted. For example, the control unit 118 of the TBS 100-2 instructs the PDU generation unit 113 to generate an HO-rsp message containing this information, and that message is transmitted from the PDU generation unit 113.

Next, when the HO-rep message is received, the SBS 100-1 transmits a BSHO-RSP message to the MS 200 (S21). The BSHO-RSP message contains the TBS able to be accepted by the MS 200 (recommended TBS). For example, the control unit 118 and the PDU generation unit 113 of the SBS 100-1 generate the message and transmit the message to the MS 200.

Next, the SBS 100-1 transmits an HO-ack message to the TBS 100-2 indicating that the HO-rsp message has been received (S22). For example, the control unit 118 and the PDU generation unit 113 of the SBS 100-1 generate that message and transmit the message to the TBS 100-2.

The MS 200 that has received the BSHO-RSP message transmits an HO-IND message to the SBS 100-1 (S23). The HO-IND message contains information on the TBS 100-2 serving as the handover destination. For example, the control unit 222 of the MS 200 determines the HO-IND message, and the control unit 222 and the PDU generation unit 233 generate that message and output the message to the TBS 100-2.

When the HO-IND message is received, the SBS 100-1 transmits an HO-confirm message to the TBS 100-2 (S24). The TBS 100-2 is notified of handover by the MS 200 by transmission of this message. For example, the control unit 118 and the PDU generation unit 113 of the SBS 100-1 generate that message, and the message is transmitted to the TBS 100-2.

After having transmitted the HO-IND message, the MS 200 transmits an RNG-REQ message in synchronization with the TBS 100-2 and initiates connection with the TBS 100-2 (S25). For example, the control unit 222 and the PDU generation unit 233 of the MS 200 generate that message and transmit the message to the TBS 100-2.

When the RNG-REQ message is received, the TBS 100-2 transmits an RNG-RSP message to the MS 200 (S26). The RNG-RSP message contains information such as a new connection ID (CID). For example, the control unit 118 and the PDU generation unit 113 of the TBS 100-2 generate that message and transmit the message to the MS 200. Subsequently, the TBS 100-2 becomes the new SBS.

The following provides a detailed explanation of setting the scanning period, "scan duration" (S13). The scanning period includes, for example, an amount of time required for synchronizing with the surround BS 100 and an amount of time required for measuring the reception signal level. The MS 200 is able to receive DCD and UCD messages during measurement of the reception signal level.

The time required for synchronization consists of, for example, setting the length of that time based on a central frequency (such as FA) of each surround BS 100. FIG. 11 illustrates an example of the relationship between central frequencies of each BS 100.

FIG. 11 illustrates an example in which there are 8 surround BS 100 ($BS_{11}$ and $BS_{13}$-$BS_{33}$) for the SBS 100-1, and a preamble is applied using 3 central frequencies (f1 to f3 at a bandwidth of 10 MHz) and 3 subchannels.

When the central frequency of the SBS 100-1 is "f1" (SBS 100-1 is indicated as $BS_{12}$ in FIG. 11), the MS 200 detects the preamble extremely rapidly by comparing the surround $BS_{11}$ and $BS_{13}$ that use different subchannel of the same central frequency with the surround $BS_{21}$ to $BS_{33}$ that use different central frequencies. Conversely, detection of preamble by the MS 200 by synchronizing with the $BS_{21}$ to $BS_{33}$ that use different central frequencies requires time to compare $BS_{11}$ and $BS_{13}$. The MS 200 determines the time required for synchronization and further determines the "scan duration" in consideration of this.

On the other hand, at the time of system design, for example, the transmission timing at which DCD and UCD messages are transmitted from each BS 100 can be set so that the messages are transmitted cyclically in consideration of the time required for synchronization of the MS 200.

For example, the timing at which a BS 100 having a different central frequency (such as $BS_{21}$ in the example of FIG. 11) transmits DCD and UCD messages provides an adequate time interval for enabling synchronization by the MS 200 by adjusting the central frequency. In addition, a BS 100 that uses different subchannel having the same central frequency (such as $BS_{11}$ in the example of FIG. 11) secures a time interval during which the MS 200 is able to measure reception signal level, and shortens the time interval as much as possible so that all BS 100 can be scanned during a single scanning period.

Thus, for example, the MS 200 is able to receive DCD and UCD messages by synchronizing with all BS 100 at a short time interval without waiting until the time the next DCD and UCD messages are transmitted.

Figure 12A:
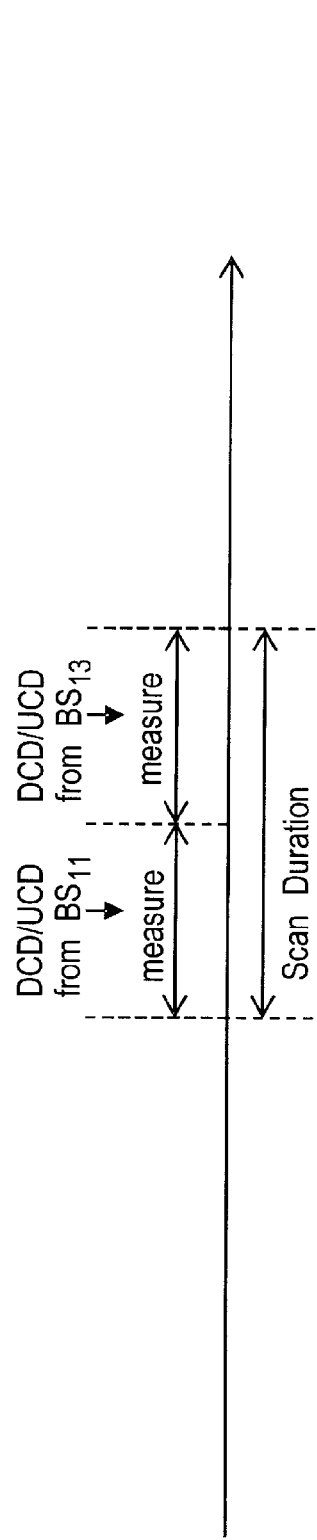
FIGS. 12A and 12B illustrate examples of settings for the transmission timing of DCD and UCD messages and "scan duration"
Figure 12B:
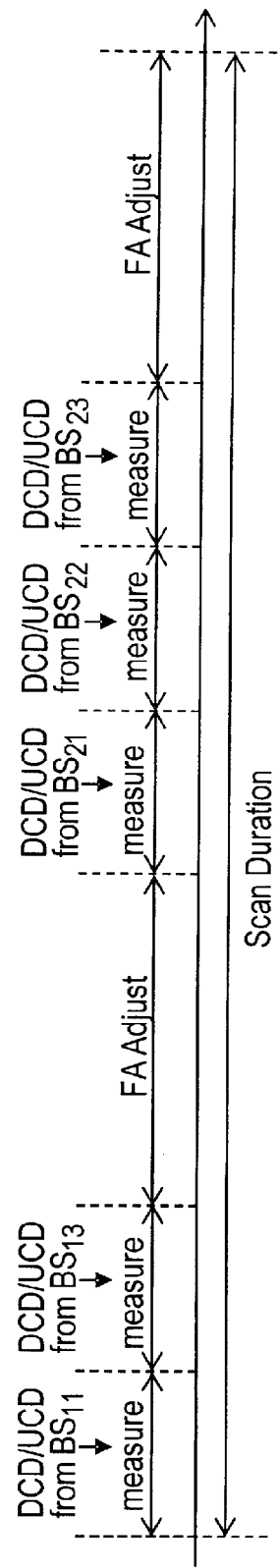
Figure 13A:
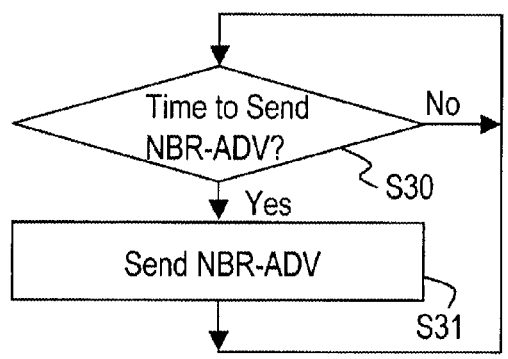
FIGS. 13A and 13B are flow charts illustrating examples of operation in a base station apparatus.
Figure 13B:
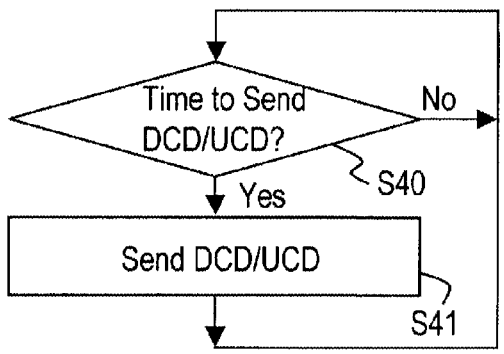

FIGS. 12A and 12B illustrate examples of setting the transmission timing of DCD and UCD messages and "scan duration".

FIG. 12A illustrates an example of setting in the case the central frequency is the same as that of the SBS 100-1. Since the central frequency is the same, the MS 200 does not require time to adjust the central frequency.

On the other hand, FIG. 12B illustrates an example of setting in the case the central frequency differs from that of the SBS 100-1. In this case, the MS 200 requires time to adjust the central frequency ("FA Adjust"), and set the "scan duration" in consideration of this time. Furthermore, the "scan duration" illustrated in FIG. 12B is the total amount of time required to scan the surround BS 100 having the same central frequency, adjust the central frequency, scan the surround BS 100 having a different central frequency, and again adjust the central frequency in order to connect to the SBS 100-1.

In addition, although the examples illustrated in FIGS. 12A and 12B indicate examples of specifying a single scanning period, the MS 200 can also specify by dividing into two or more scanning periods. Since communication with the SBS 100-1 is interrupted during scanning, the MS 200 is able to shorten the continuous interruption time by dividing the scanning period.

FIGS. 13 to 16 are flow charts illustrating examples of processing carried out by the BS 100 and MS 200. FIG. 13A is a flow chart illustrating transmission processing NBR-ADV messages, while FIG. 13B is a flow chart illustrating respective examples of transmission processing of DCD and UCD messages.

When the time for transmitting the NBR-ADV message is reached (Yes in S30), the BS 100 transmits the NBR-ADV message (S31). On the other hand, when the time for sending that message has not been reached (No in S30), the BS 100 repeats processing until that time is reached (S30). After transmitting the message, processing again proceeds to S30.

For example, when time has been measured by a timer and a transmission time stored in the storage unit 117 is reached, the control unit 118 of the BS 100 instructs the PDU generation unit 113 to generate an NBR-ADV message, and that message is transmitted from the PDU generation unit 113.

In addition, when the time for transmitting DCD and UCD messages is reached (Yes in S40), the BS 100 transmits the DCD and UCD messages (S41). On the other hand, when the time for transmitting those messages has not been reached, the BS 100 repeats this processing (S40) until that time is reached. After transmitting the messages, processing again proceeds to S41.

For example, the control unit 118 sets a time, and DCD and UCD messages are transmitted by the PDU generation unit 113.

Figure 14A:
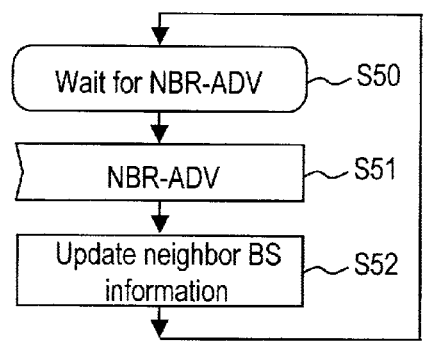
FIGS. 14A and 14B are flow charts illustrating examples of operation in a terminal apparatus.
Figure 14B:
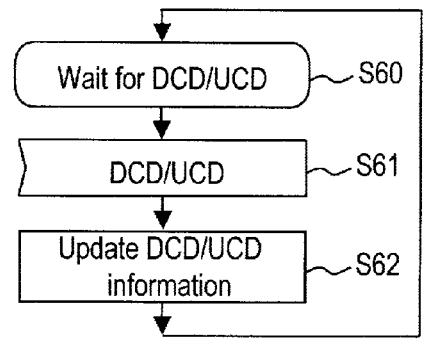

FIG. 14A is a flow chart illustrating an example of reception processing of NBR-ADV messages by the MS 200, while FIG. 14B is a flow chart illustrating an example of reception processing of DCD and UCD messages by the MS 200.

The MS 200 waits for an NBR-ADV message to be transmitted from the SBS 100-1 (S50), and when an NBR-ADV message is received (S51), updates surround base station information contained in the NBR-ADV message (S52). The surround base station information includes identification information of the surround BS 100, and instruction information for transmission of DCD and UCD messages by the surround BS 100. After updating, processing again proceeds to S50.

In addition, the MS 200 waits for DCD and UCD messages to be received from the surround BS 100 (S60), and when those messages have been received based on instruction information (S61), updates DCD and UCD information contained in those messages (S62). The DCD and UCD information respectively contains "UCD settings" and "DCD settings". After updating, processing again proceeds to S60.

Updating (S52, S62) is carried out by, for example, the control unit 222 storing each piece of information in the storage unit 221.

Figure 15A:
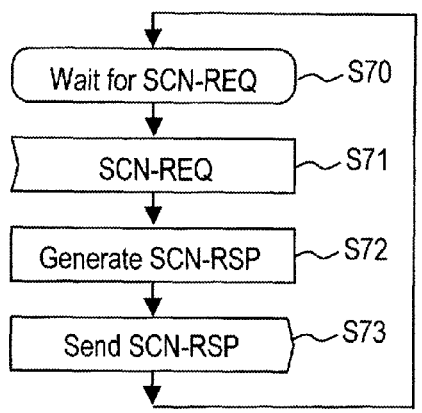
FIGS. 15A and 15B are flow charts illustrating examples of negotiation processing and the like of a scanning period.
Figure 15B:
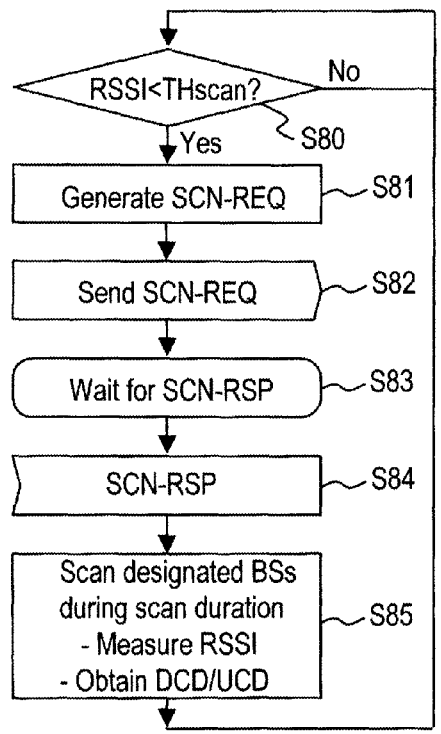

FIG. 15A is a flow chart illustrating an example of negotiation processing during the scanning period in the SBS 100-1, while FIG. 15B is a flow chart illustrating an example of negotiation processing and scan processing in the MS 200.

The SBS 100-1 waits for an SCN-REQ message to be transmitted from the MS 200 (S70), and when the SCN-REQ message is received (S71), generates an SCN-RSP message (S72) and transmits that message to the MS 200 (S73). The SCN-RSP message contains information such as information on a TBS candidate (recommended TBS) and parameter information for specifying the scanning period. After the SCN-RSP message has been transmitted, processing again proceeds to S70.

On the other hand, the MS 200 waits until the reception signal level (such as RSSI) has fallen below a threshold value (THscan) (No in S80), and when it has fallen below the threshold value (Yes in S80), generates an SCN-REQ message (S81) and transmits that message to the SBS 100-1 (S82). The SCN-REQ message contains information such as parameter information for specifying a scanning period for the surround BS to be scanned by the MS 200.

Next, the MS 200 waits for the SCN-RSP message to be received (S83), and when that message is received (S84), executes scanning at the scanning period, measures the reception signal level (such as RSSI) of the surround BS 100 by synchronizing with the surround BS 100, and receives DCD and UCD messages from the surround BS 100 (S85). After carrying out the processing of S85, the MS 200 again carries out processing of S80.

Figure 16A:
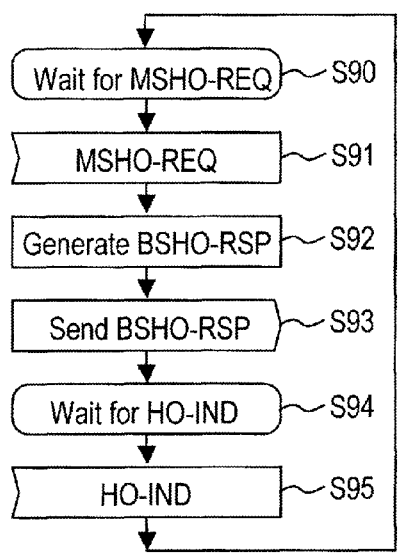
FIGS. 16A and 16B are flow charts illustrating examples of handover processing.
Figure 16B:
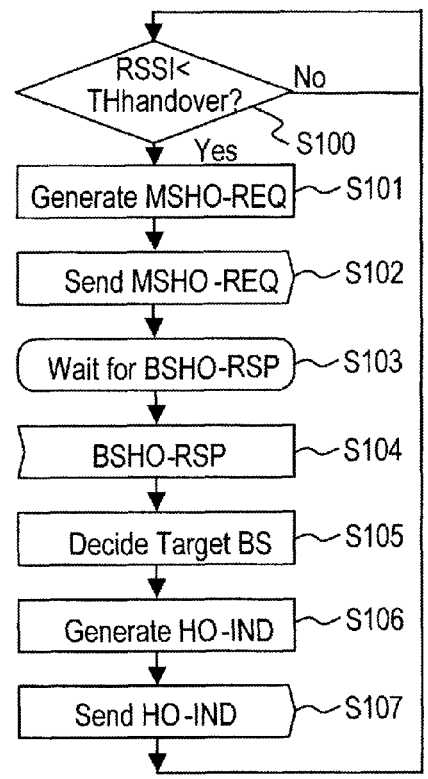

FIG. 16A is a flow chart illustrating an example of handover processing by the SBS 100-1, while FIG. 16B is a flow chart illustrating handover processing by the MS 200.

The SBS 100-1 waits for an MSHO-REQ message to be transmitted from the MS 200 (S90), and when that message is received (S91), generates a BSHO-RSP message (S92). The SBS 100-1 then transmits the BSHO-RSP message to the MS 200 (S94), waits for an HO-IND message to be transmitted from the MS 200 (S95), and then transmits that message (S95). Processing subsequently again proceeds to S90.

On the other hand, the MS 200 waits for the reception signal level (such as RSSI) to fall below a threshold value (THhandover) (No in S100), and when the reception signal level falls below the threshold value (Yes in S100), generates an MSHO-REQ message (S101) and transmits that message to the SBS 100-1 (S102).

The MS 200 then waits for a BSHO-RSP message to be transmitted from the SBS 100-1 (S103), and when that message is received (S104), determines a TBS (S105). Subsequently, the MS 200 generates an HO-IND message (S106) and transmits that message to the SBS 100-1 (S107). Processing again proceeds to S100.

In this manner, in the present embodiment, the SBS 100-1 transmits instruction information, including NBR-ADV messages, required for the surround BS to receive DCD and UCD messages, and the MS 200 receives the DCD and UCD messages from the surround BS 100 based on that instruction information and the like.

Thus, since communication parameter information for connecting to the surround BS, such as "DCD settings" and "UCD settings", are not contained in NBR-ADV messages, the SBS 100-1 is able to transmit using a smaller radio band than in the case of transmitting NBR-ADV messages containing this information. Thus, the SBS 100-1 is able to more effectively utilize radio bands since it can be used to transmit and receive other data.

On the other hand, since NBR-ADV messages do not contain communication parameter information of the surround BS 100, the MS 200 is not required to process this information, thereby making it possible to reduce power consumption. Since the amount of information contained in the NBR-ADV message has decreased, handover time can be shortened in comparison with the case of containing communication parameter information. The MS 200 receives communication parameter information for connecting the surround BS 100 from DCD and UCD messages from the surround BS 100.

Third Embodiment

Figure 17:
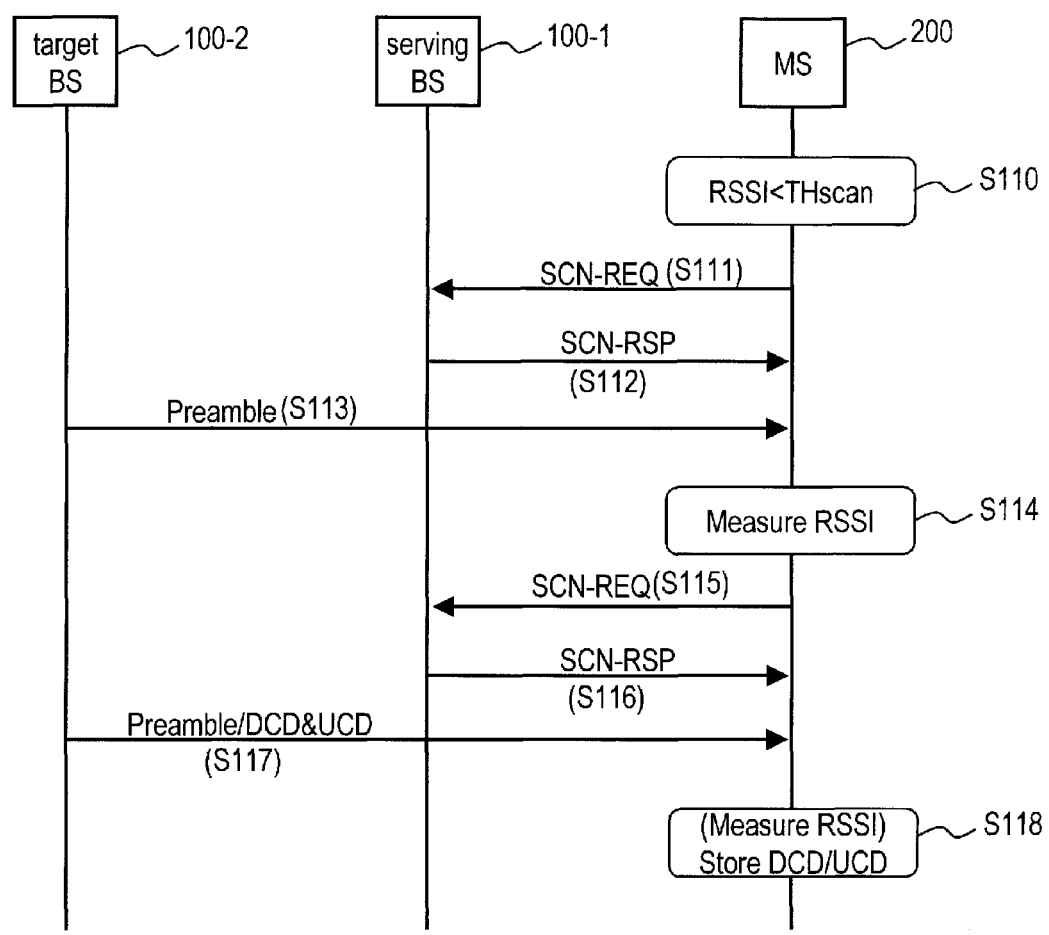
FIG. 17 is a sequence diagram illustrating another example of operation in a radio communication system.

Next, an explanation is provided of a third embodiment. FIG. 17 is a sequence diagram illustrating an example of operation in this third embodiment.

The MS 200 receives an NBR-ADV message from the SBS 100-1, and when the reception signal level (such as RSSI or CINR) from the SBS 100-1 becomes lower than a threshold value (THscan) (S110), the MS 200 transmits an SCN-REQ message to the SBS 100-1 (S111).

In this third embodiment, the MS 200 sets a duration during which the reception signal level of the preamble from the surround BS 100 can be measured as a first scanning period, and transmits that first scanning period included in an SCN-REQ message. The scanning period for measuring preamble may be specified with each of the parameters consisting of the radio frame that initiates scanning following transmission of the SCN-REQ message ("start frame"), the scanning period ("scan duration") and the repeating period of the scanning period ("scan interval") in the same manner as in the second embodiment. In consideration of a plurality of the surround BS, the MS 200 may also include "BS ID" and "Preamble Index" in the SCN-REQ message.

For example, the control unit 222 of the MS 200 sets the parameters of the scanning period based on instruction information received in an NBR-ADV message, and together with instructing the PDU generation unit 233 to generate an SCN-REQ message, outputs those parameters. The SCN-REQ message is then transmitted from the PDU generation unit 233 via the encoding unit 234 and the like.

When the SCN-REQ message is received, the SBS 100-1 transmits an SCN-RSP message to the MS 200 (S112). The SCN-RSP message contains, for example, parameters specifying the scanning period, and the "BS ID" and "Preamble Index" of the surround BS 100 to be scanned. If this information is included in the SCN-REQ message, the SBS 100-1 may directly include that information in the SCN-RSP message, or may include information determined by the SBS 100-1.

When the SCN-REP message is received, the SBS 100-1 synchronizes with the surround BS 100 during the scanning period included in the SCN-RSP message, receives the preamble from the surround BS 100, and measures the reception signal level thereof (such as RSSI) (S113, S114). The MS 200 may also transmit the reception signal level to the SBS 100-1. The MS 200 searches for the surround BS 100 having a reception signal level equal to or higher than a threshold value by measuring the reception signal level.

Next, the MS 200 transmits an SCN-REQ message to the SBS 100-1 in order to negotiate a second scanning period for receiving DCD and UCD messages from the surround BS 100 having a reception signal level equal to or greater than a threshold value (S115). The MS 200 sets parameters that specify the scanning period, such as "scan duration", so that DCD and UCD messages can be received during the second scanning period, and transmits the parameters included in an SCN-REQ message.

When the SCN-REQ message is received, the SBS 100-1 transmits an SCN-RSP message to the MS 200 that contains parameters that specify the second scanning period and parameters such as "BS ID" and "Preamble Index" of the surround BS 100 to be scanned (S116). The parameters that specify the second scanning period may also be parameters determined by the SBS 100-1 per se, or parameters transmitted from the MS 200 may be returned as is.

Next, the MS 200 synchronizes with the surround BS during the specified second scanning period, and receives DCD and UCD messages from the surround BS 100 during that scanning period (S118). Communication parameter information such as "DCD settings" or "UCD settings" can be received by the MS 200 by receiving the DCD and UCD messages.

Furthermore, the SBS 100-1 is not allowed to transmit data or control information to the MS 200 during the scanning period. In addition, information contained in the DCD and UCD messages received by the MS 200 is stored in the storage unit 221. Moreover, the MS 200 may also measure the reception signal level of the "Preamble".

In this third embodiment as well, since communication parameter information for connecting to the surround BS 100 is not contained in NBR-ADV messages, the SBS 100-1 is able to transmit using a smaller radio band in comparison with the case of transmitting NBR-ADV messages containing this information. Thus, radio bands can be utilized effectively.

On the other hand, since communication parameter information of the surround BS 100 is not contained in NBR-ADV messages, power consumption can be reduced since the MS 200 is no longer required to process that information.

In the third embodiment as described above, the MS 200 separately carried out a first scanning period for measuring preamble and a second scanning period for receiving DCD and UCD messages (S111, S115). This is for optically setting the second scanning period corresponding to the surround BS 100 capable of receiving the preamble. For example, the MS 200 may also specify the second scanning period when setting the first scanning period.

In addition, after carrying out the first scan (S113, S114), in the case the reception signal level from the SBS 100-1 has deteriorated to the degree that it is necessary to execute handover, the MS 200 can also execute handover without negotiating the second scan (S115, S116). In this case, the MS 200 synchronizes with the TBS 100-2 after transmitting an HO-IND message (S23), and receives DCD and UCD messages from the TBS 100-2 at that time. Since the TBS 100-2 retains instruction information for DCD and UCD messages, the MS 200 is able to receive DCD and UCD messages based on that information by receiving an NBR-ADV message (S10). Subsequently, the MS 200 executes handover by transmitting an RNG-REQ message to the TBS 100-2 (S25).

A radio communication method in a radio communication system effectively utilizing the radio band, a radio communication system, a base station apparatus and a terminal apparatus are able to be provided. In addition, the increases in the complexity of processing can be suppressed. In addition, a radio communication method in a radio communication system that reduces power consumption of a terminal can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A radio communication method in a radio communication system including a base station apparatus and a terminal apparatus, the method comprising:
   generating an advertisement message including identification information of a surrounding base station apparatus of the base station apparatus, and instruction information for receiving communication parameter information used to communicate with the terminal and the surrounding base station apparatus from the surrounding base station apparatus, by the base station apparatus;
   transmitting the generated advertisement message, by the base station apparatus;
   receiving the advertisement message, by the terminal apparatus; and
   receiving the communication parameter information transmitted by the surrounding base station apparatus based on the instruction information included in the advertisement message, by the terminal apparatus, wherein
   the instruction information includes a transmission timing indicating frame offset and interval for the surrounding base station apparatus to transmit the communication parameter information.

2. The radio communication method according to claim 1, wherein
   the terminal apparatus searches a reception signal level of the surrounding base station apparatus based on the identification information included in the advertisement message, when the terminal apparatus receives the communication parameter information, and
   the terminal apparatus receives the communication parameter information from the surrounding base station apparatus for which the searched reception signal level is equal to or greater than a threshold value.

3. The radio communication method according to claim 1, wherein
   the terminal apparatus synchronizes with the surrounding base station apparatus based on the identification information included in the advertisement message, when the terminal apparatus receives the communication parameter information, and the terminal apparatus receives the communication parameter information from the synchronized surrounding base station apparatus.

4. The radio communication method according to claim 1, wherein the terminal apparatus receives the communication parameter information at the transmission timing.

5. The radio communication method according to claim 1, further comprising:

transmitting to the base station apparatus an interruption period for receiving the communication parameter information based on the advertisement message, by the terminal apparatus; and determining the interruption period of the terminal apparatus based on the interruption period received from the terminal apparatus, and transmitting the determined interruption period to the terminal apparatus, by the base station apparatus, wherein the terminal apparatus receives the communication parameter information during the interruption period received from the base station apparatus.

6. The radio communication method according to claim 5, wherein the interruption period differs for every radio frequency used by the surrounding base station apparatus.

7. The radio communication method according to claim 5, wherein the interruption period includes a time or number of radio frames at which interruption of radio communication with the base station apparatus is initiated, a time or number of radio frames indicating the interruption period, and a time or number of radio frames indicating a repeating period of the interruption period.

8. The radio communication method according to claim 1, further comprising storing the identification information, the instruction information, and the communication parameter information in a storage unit.

9. The radio communication method according to claim 1, wherein the advertisement message is an NBR-ADV message, and the communication parameter information is included in a DCD and UCD messages.

10. A radio communication system comprising:

a base station apparatus; and a terminal apparatus, wherein the base station apparatus includes:

a processor configured to generate an advertisement message including identification information of a surrounding base station apparatus of the base station apparatus, and instruction information for receiving communication parameter information used to communicate with the terminal and the surrounding base station apparatus from the surrounding base station apparatus, and a radio communication interface configured to transmit the generated advertisement message, the terminal apparatus includes:

a radio communication interface configured to receive the advertisement message, and receive the communication parameter information transmitted by the surrounding base station apparatus based on the instruction information included in the advertisement message, and the instruction information includes a transmission timing indicting frame offset and interval for the surrounding base station apparatus to transmit the communication parameter information.

11. A base station apparatus for performing radio communication with a terminal apparatus, the base station apparatus comprising:

a processor configured to generate an advertisement message including identification information of a surrounding base station apparatus of the base station apparatus, and instruction information for receiving communication parameter information used to communicate with the terminal and the surrounding base station apparatus from the surrounding base station apparatus; and a radio communication interface configured to transmit the generated advertisement message, wherein the instruction information includes a transmission timing indicating frame offset and interval for the surrounding base station apparatus to transmit the communication parameter information.

12. A terminal apparatus for performing radio communication with a base station apparatus, comprising:

a radio communication interface configured to receive an advertisement message including identification information of a surrounding base station apparatus of the base station apparatus, and instruction information for receiving communication parameter information used to communicate with the terminal and the surrounding base station apparatus from the surrounding base station apparatus, and receive the communication parameter information transmitted from the surrounding base station apparatus based on the instruction information included in the advertisement message, wherein the instruction information includes a transmission timing indicating frame offset and interval for the surrounding base station apparatus to transmit the communication parameter information.

* * * * *